US005973593A

United States Patent [19]
Botella

[11] Patent Number: 5,973,593

[45] Date of Patent: Oct. 26, 1999

[54] DEVICE FOR MARKING THE POSITION OF AUTOMATIC TRANSMISSION GEARSHIFT LEVER ARMS

[75] Inventor: Octavio Lorente Botella, Granollers, Spain

[73] Assignee: Fico Triad, S.A., Barcelona, Spain

[21] Appl. No.: 08/773,961

[22] Filed: Dec. 26, 1996

[30] Foreign Application Priority Data

Apr. 26, 1995 [ES] Spain .................................... 9500798

[51] Int. Cl.[6] ........................................................ B60Q 1/00

[52] U.S. Cl. ....................... 340/456; 340/461; 200/61.88; 116/28.1

[58] Field of Search .................................... 340/456, 438, 340/461, 482, 483, 488, 489, 815.45, 815.55, 815.56, 524, 525; 200/61.88, 61.91; 116/28.1; 74/335; 477/63

[56] References Cited

U.S. PATENT DOCUMENTS

| | | | |
|---|---|---|---|
| 4,155,068 | 5/1979 | Zajichek | 340/456 |
| 4,821,590 | 4/1989 | Tury et al. | 74/335 |
| 4,882,572 | 11/1989 | Lippmann et al. | 340/456 |
| 4,896,135 | 1/1990 | Deeds et al. | 340/456 |
| 4,980,803 | 12/1990 | Richmond et al. | 362/23 |
| 5,009,128 | 4/1991 | Seidel et al. | 74/866 |
| 5,398,018 | 3/1995 | Polityka | 340/456 |
| 5,420,565 | 5/1995 | Holbrook | 340/456 |
| 5,512,875 | 4/1996 | Polityka | 340/456 |
| 5,561,416 | 10/1996 | Marshall et al. | 340/456 |
| 5,584,209 | 12/1996 | Issa | 74/335 |
| 5,675,315 | 10/1997 | Issa et al. | 340/456 |
| 5,696,483 | 12/1997 | Khalid et al. | 340/456 |

*Primary Examiner*—Jeffery A. Hofsass
*Assistant Examiner*—Toan N. Pham
*Attorney, Agent, or Firm*—Michael J. Striker

[57] ABSTRACT

The marking device includes a plurality of LED diodes (10,20,30,40,50,60,70) fitted to respective translucent marking plates (L1,L2,L3,L4,L5,L6,L7) whose number corresponds to that of the selectable positions of the gear shift lever arm (6). Each LED diode is electrically connected to a respective voltage divider consisting of two series-connected resistors (11,12; 21,22; 31,32; 41,42; 51,52; 61,62; 71,72) connected in series with the respective LED diode. A lever switch (2) cooperating with the gear switch lever arm (6) is connected with the voltage dividers so that all LED diodes are energized but the LED diode corresponding to the selected lever arm position emits a higher-level light flux than the remaining LED diodes.

2 Claims, 3 Drawing Sheets

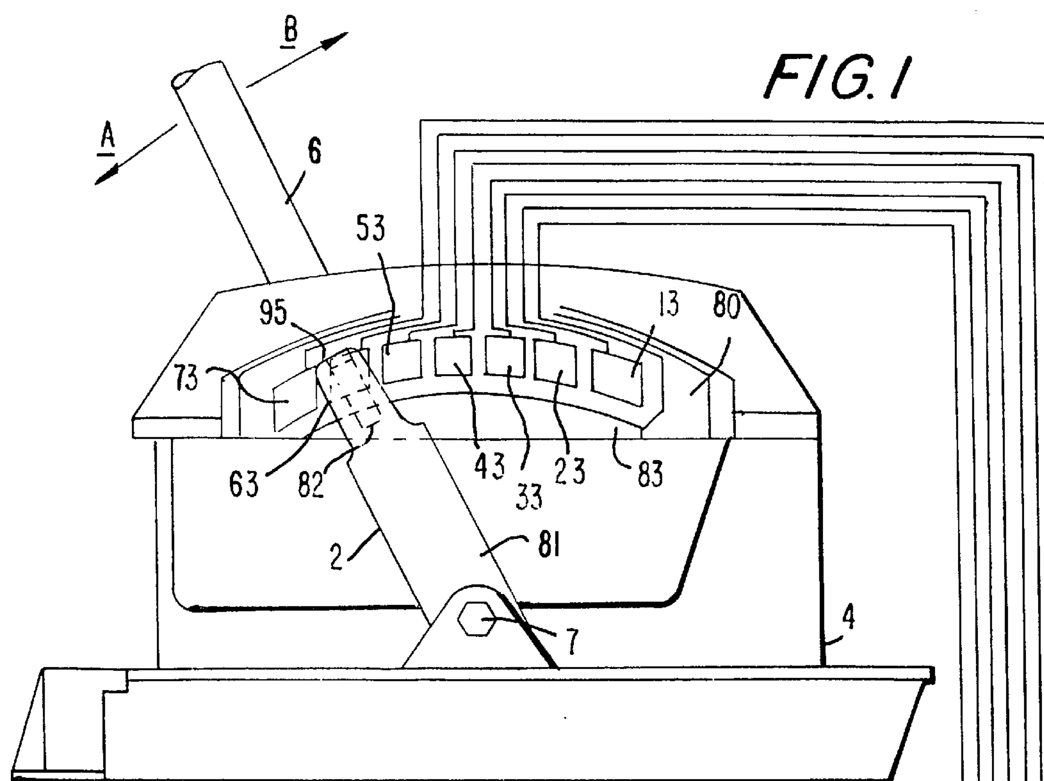
FIG. 1
A
B
6
53
95
73
13
80
63
82
43
33
23
83
81
2
7
4
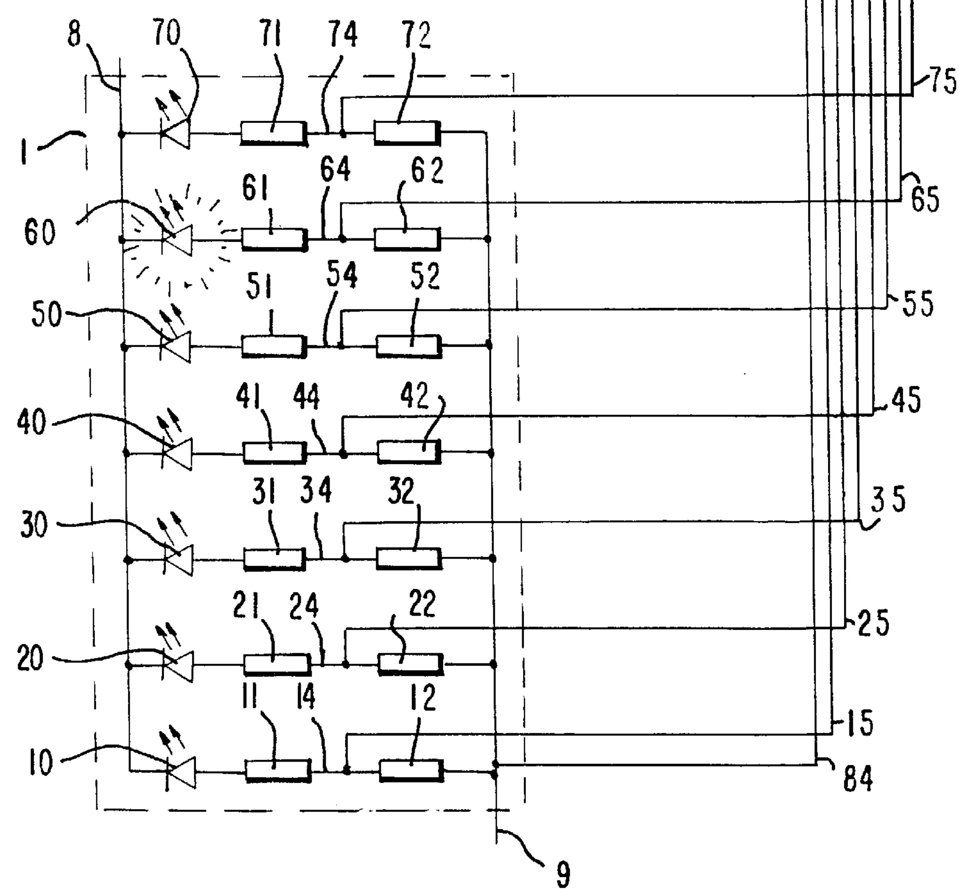
8
70
71
74
72
75
1
60
61
64
62
65
50
51
54
52
55
40
41
44
42
45
30
31
34
32
35
20
21
24
22
25
10
11
14
12
15
84
9

DEVICE FOR MARKING THE POSITION OF AUTOMATIC TRANSMISSION GEARSHIFT LEVER ARMS

BACKGROUND OF THE INVENTION

1. Technical Field of the Invention

The object of the present invention is a device for marking the position of automatic transmission gearshift lever arms of automobile vehicles, being of the type which employs a lit-up marker to show the user the possible positions which the lever can take up and, by means of extra lighting, the selected or working position of the lever.

2. Prior Art

Known in the art are an extensive variety of embodiments of devices for marking the selectable positions of automatic transmission gearshift lever arms and the position selected by the user or working position. In general, the known embodiments of marking devices such as those cited are fitted to the support of the gearshift lever and include, on the external cover of the support which is traversed by the lever arm, a plurality of translucent marking plates of relatively small dimensions whose number and layout correspond with the positions in which the user may situate the lever arm, each marking plate being provided with a corresponding graphic sign to show the working speed of the gearbox. Mounted inside each of the marking plates are means of lighting powered by the battery of the vehicle and permitting the graphic sign on the plate to be seen. In order to achieve brighter lighting of the marking plate for the working position of the lever, the known embodiments of marking devices include means of extra lighting which are in general based on the reflective properties of a specular surface in order to achieve, by means of reflection of the incident light beam coming from the corresponding means of lighting, an extra lighting of the marking plate which thus differentiates it from the other adjacent marking plates. Such means of extra lighting by reflection essentially include a prismatic body provided with a reflective surface which is attached to the lever arm in such a way that both, arm and reflective body, take up the same relative position independently of the working position of the lever.

In general, the means of extra lighting which use a reflection surface coupled to the lever arm present the following main disadvantages: a) the extra lighting of the translucent plates is dependent upon the state of the reflective surface which, due to environmental conditions, may vary, reducing thereby the reflective capacity of the incident light beam and in consequence reducing the level of extra lighting of the plates; b) the fact that the reflective surface is attached to the lever arm in such a way that both take up the same relative position, together with the limitations presented by the path of the reflected light beam, imposes a certain layout of the marking plates, which layout consists specifically in situating the marking plates in positions substantially parallel to the travel of the lever arm; and c) the intensity of the extra lighting of the marking plates is difficult to adapt to the needs of each specific case of application and is even, under certain circumstances, insufficient.

SUMMARY OF THE INVENTION

A device of new structure and operation for marking the position of automatic transmission gearshift lever arms is made known hereby in order to provide a solution to the above-mentioned problems presented by the known embodiments of marking devices, in which the means of extra lighting of the plates marking the working position of the lever arm is based on reflection on a specular surface of the light beam generated by means of lighting.

The marking device of the invention includes a plurality of LED diodes whose number corresponds to the number of positions of the lever arm selectable by the user, the LED diodes being arranged, preferably, on a support plate provided with means of connection to the electrical network of the vehicle, to which they are permanently connected, with each LED diode being mounted at a relatively short distance from the internal face of a corresponding translucent marking plate provided with a graphic marking to show the working speed of the gearbox.

According to the invention, the device for marking a selected position from among a number of allowed positions of a pivotally mounted automatic transmission gearshift lever arm of a vehicle transmission in a vehicle having an electrical network, comprises a plurality of LED diodes arranged and supported on a support plate and equal in number to the number of allowed positions of the automatic transmission gearshift lever arm; a plurality of translucent marking plates, each provided with a graphic marking indicative of a working speed of the vehicle transmission and located adjacent a respective LED diode so that the graphic marking thereon is illuminated by light from the LED diode adjacent thereto when energized; and a lever switch comprising a switching plate made of insulating material and mounted on the lever arm support, a plurality of fixed electrical contacts arranged spaced from each other on the switching plate, a selector arm cooperating with the lever arm so as to move with the lever arm between allowed positions, a moving electrical contact fixed on the selector arm and an extended electrical contact extending on the switching plate so that a permanent electrical connection is maintained between the moving electrical contact and the extended electrical contact arranged on the switching plate when the lever arm is moved between the allowed positions; wherein each LED diode is directly connected to the electrical network through a respective pair of resistors connected in series, one resistor of each pair having one end thereof connected to the extended electrical contact and the other end thereof opposite from the one end connected to a respective fixed electrical contact so that for each allowed position of the lever arm, the extended electrical contact, moving electrical contact and the fixed electrical contact corresponding to the selected position of the lever arm are electrically connected so that all LED diodes are energized but the LED diode corresponding to the selected position of the lever arm emits a higher-level light flux than the remaining LED diodes.

The above-described characteristics of the marking device of the invention provide a solution to the disadvantages presented by known embodiments of devices for marking the positions of the lever arm selectable by the user, and for extra lighting of the working position of the lever arm. Indeed, the marking device of the invention achieves, on the one hand, faint and permanent lighting of each of the translucent plates marking the selectable positions of the lever arm, and on the other hand suitable extra lighting of the lever arm position selected by the user, with no reflective surface being needed for the extra lighting. Thus, the fact that the marking device of the invention requires no reflective surface to achieve extra lighting of the translucent plate marking the running speed provides a solution to the above-described disadvantages deriving from the use of said surfaces. Firstly, the power supply for the LED diodes by means of the voltage dividers of the device of the invention permits positioning of the lever arm position marking plates, which are connected to corresponding LED diodes, in any layout suitable for each specific case of application, unlike the known embodiments of marking devices in which the layout of the LED diodes, and therefore of the marking plates, is practically determined by the extra lighting of same by means of reflective surfaces. Secondly, the characteristic power supply of the marking LED diodes of the invention permits both the level of faint lighting of the marking plates and the level of extra lighting of same to be fixed simply by control, by suitable selection of the voltage divider values, of the intensity of current drawn by the diodes, thereby permitting adaptation of the lighting of the marking plates to each specific application.

Another characteristic of the marking device of the invention consists of the fact that the fixed contacts of the level switch are arranged on a switching plate mounted on the lever support.

Another characteristic of the marking device of the invention consists of the fact that the moving contact of the level switch is coupled to a selector arm which can rotate about the pivot pin of the lever arm.

Another characteristic of the marking device of the invention consists of the fact that the moving contact of the level switch includes a first contact mounted on the selector arm and a second contact mounted on the switching plate with which the first contact establishes permanent connection.

Another characteristic of the marking device of the invention consists of the fact that each of the voltage dividers includes two resistors connected in series and mounted on the support plate.

Another characteristic of the marking device of the invention consists of the fact that the voltage dividers have at least one of their ends connected to each other and to one of the conductors or terminals of the electrical network of the vehicle, while the other end is connected to a corresponding LED diode.

Another characteristic of the marking device of the invention consists of the fact that the switching plate and the support plate include respective means of interconnection and connection with the electrical network of the vehicle.

BRIEF DESCRIPTION OF THE DRAWING

The objects, features and advantages of the invention will now be illustrated in more detail with the aid of the following description of the preferred embodiments, with reference to the accompanying figures, in which:

FIG. 1 is a schematic view of one embodiment of the marking device invention having to a lever arm on which seven positions are selectable, the level switch here occupying a sixth position;

DESCRIPTION OF THE PREFERRED EMBODIMENT

Figure 2:
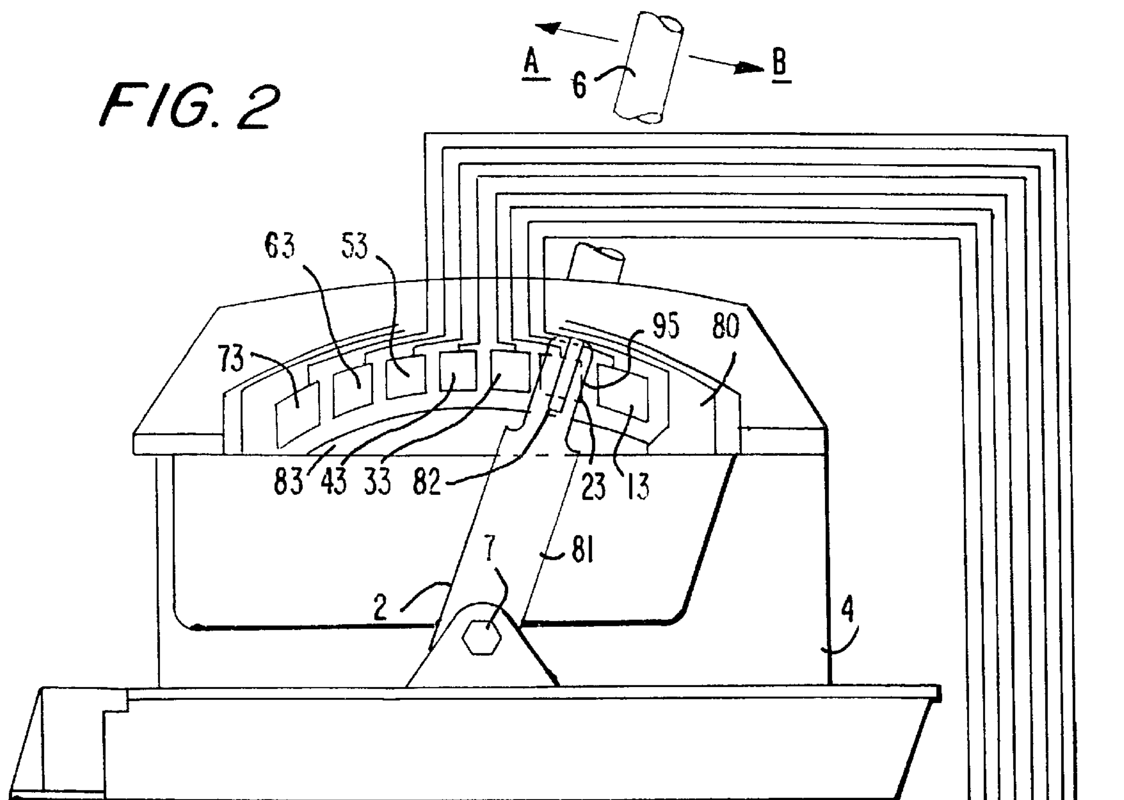
FIG. 2 is a schematic view of the marking device of the invention of FIG. 1, in which the level switch is occupying a second position.
Figure 3:
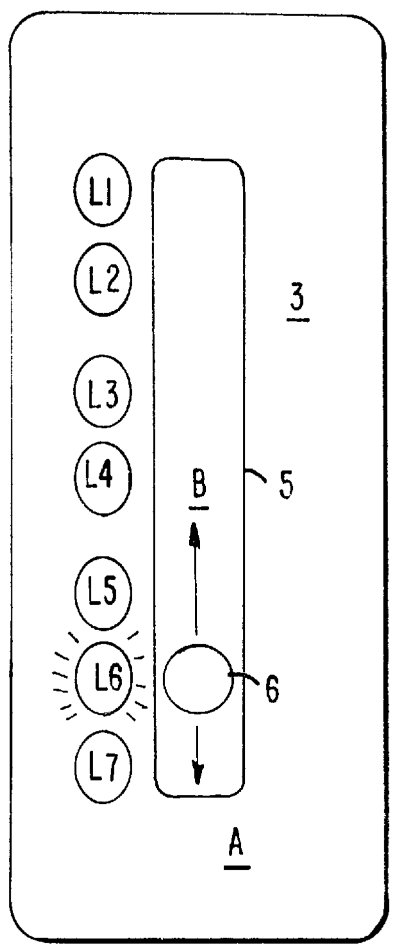
FIGS. 3 and 4 are respective schematic views of an external cover of the gearshift lever support, on which the translucent plates marking the lever positions shown in FIGS. 1 and 2, respectively, have extra lighting.

For the purposes of achieving greater clarity of outline, in the following description of the example of embodiment of the marking device of the invention reference is made to FIGS. 1 and 3 of the drawing sheets, while FIGS. 2 and 4 relate to the same parts as shown in FIGS. 1 and 3, differentiated only by their different relative positions. These premises stated, the marking device of the invention includes a support plate 1 indicated by means of broken lines, and a level switch 2.

The support plate 1 is made of an insulating material and is mounted at a relatively short distance from the internal face, not shown, of an external cover 3, shown in FIG. 3, superimposed upon a support 4, shown in FIG. 1, of the automatic transmission gearshift lever, fixed to the vehicle structure. The external cover 3 has a layout and finish which match the finish of the vehicle passenger compartment, and it has a slot 5 through which there projects the external end of the lever arm 6 which can be moved by the user in both directions, indicated as A and B in FIGS. 1 and 2, by means of turning about a pivot pin 7 mounted in the support 4. In this example of application of the marking device of the invention the lever arm 6 can be moved optionally to a total of seven positions selectable by the user; it is understood that this number of positions is given solely by way of non-restrictive example, for the number of positions which the lever arm 6 can take up will be determined for each specific case of application, without this affecting the essential nature of the invention. The external cover 3 further includes a total of seven translucent marking plates which have the references L1, L2, L3, L4, L5, L6 and L7, the layout of which corresponds with that of the LED diodes of the support plate 1 numbered 10, 20, 30, 40, 50, 60 and 70, respectively, that is, marking plate L1 has LED diode 10 for the lighting of its internal side, marking plate L2 has LED diode 20, and so forth. Each of the marking plates L1 to L7 has a corresponding graphic sign, not shown, which indicates the working speed of the automatic transmission gearbox.

On the support plate 1, the LED diodes 10, 20, 30, 40, 50, 60 and 70 have their respective cathodes connected to each other and to the electrical network of the vehicle, and specifically to the negative terminal, by means of an electrical connection indicated with reference 8. The anodes of the LED diodes 10, 20, 30, 40, 50, 60 and 70 are connected to a respective voltage divider comprising two resistors connected in series and indicated with references in accordance with those used to indicate the LED diodes, that is, the voltage divider connected to the anode of LED diode 10 includes two resistors 11, 12, the voltage divider of LED diode 20 includes two resistors 21, 22, the voltage divider of LED diode 30 includes two resistors 31, 32, the voltage divider of LED diode 40 includes two resistors 41, 42, the voltage divider of LED diode 50 includes two resistors 51, 52, the voltage divider of LED diode 60 includes two resistors 61, 62 and the voltage divider of LED diode 70 includes two resistors 71, 72; it is understood that the voltage dividers are the same as each other, that is, all the LED diodes in this example of embodiment can work under equal conditions of voltage and current. With these layouts, the anode of LED diodes 10, 20, 30, 40, 50, 60 and 70 is connected to the end of a respective voltage divider, specifically to resistors 11, 21, 31, 41, 51, 61 and 71, while the other ends of the voltage dividers, that is, resistors 12, 22, 32, 42, 52, 62 and 72 are connected to each other and to the electric network of the vehicle, specifically to the positive terminal, by means of an electrical connection indicated with reference 9.

The level switch 2 includes a switching plate 80 made of an insulating material and fixed onto the support 4, and a selecting arm 81 which is attached to the lever arm 6 and can turn around the pivot pin 7. On the switching plate 80 are mounted a total of seven fixed contacts indicated with references 13, 23, 33, 43, 53, 63 and 73 to correspond with the references assigned to the LED diodes 10, 20, 30, 40, 50, 60 and 70. The seven fixed contacts 13, 23, 33, 43, 53, 63 and 73 are laid out to correspond with the seven selectable positions which the lever arm 6 can occupy, and are so dimensioned that they can take up the positioning tolerances which might be presented by the lever arm 6. The level switch 2 includes a moving contact 95 made up of a first contact 82 fixed to the selecting arm 81 and shown in FIG. 1 by means of broken lines, and a second contact 83 mounted on the switching plate 80; both contacts 82, 83 are so dimensioned that they establish permanent electrical contact between each other independently of the position occupied by the selecting arm 81. Each one of the fixed contacts 13, 23, 33, 43, 53, 63 and 73 is connected to a corresponding intermediate point 14, 24, 34, 44, 54, 64 and 74 of the voltage dividers by means of a conductor 15, 25, 35, 45, 55, 65 and 75, in both cases respectively, while the second contact 83 of the moving contact 95 is linked to the electrical connection 9 by means of a conductor 84.

Preferably, the parts mounted on the support plate 1 are interconnected by a printed circuit. Similarly, the parts mounted on the switching plate 80 make up a printed circuit. For the purposes of greater clarity of outline, the connectors which permit interconnection between the conductors 15, 25, 35, 45, 55, 65, 75 and 84 and the support 1 and switching plate 80 are not shown, but may clearly adopt any configuration suitable for each specific case of application.

Figure 4:
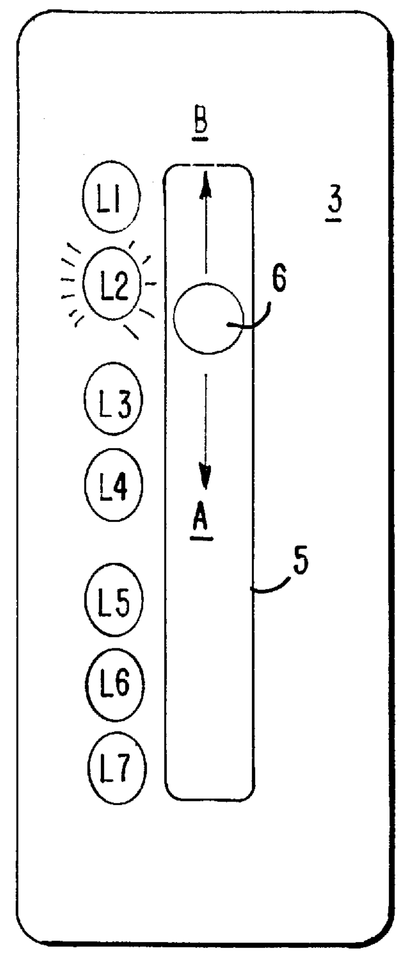

Once the support plate 1 has been mounted in the external cover 3 and the level switch 2 on the support 4, and they have been interconnected with each other by conductors 15, 25, 35, 45, 55, 65, 75 and 84 and with the electrical network of the vehicle through connections 8 and 9, the operation of the marking device of the invention is as described below:

FIGS. 1 and 3 show the lever arm 6 situated in the position indicated as L6 in FIG. 3, and with this layout the moving contact 95 of the level switch 2 makes connection with the fixed contact 63 by connecting the intermediate point 64 of the voltage divider formed by resistors 61–62 with the positive terminal 9 which connects with the electrical network of the vehicle, so that the intensity of current through LED diode 60 is limited solely by resistor 61;

furthermore, the remaining LED diodes, that is, LED diodes 10, 20, 30, 40, 50, 60 and 70, remain connected to the electrical network of the vehicle through the connections 8 and 9 and have a current passing through them which is limited by the resistors which make up the voltage divider to which they are connected, respectively, that is, the LED diode 10 has a current passing through it which is limited by the resistors 11 and 12 connected in series, LED diode 20 by the resistors 21 and 22, and so forth;

under these conditions the intensity of the current passing through the LED diode 60 is higher than the intensity of the current passing through the remaining LED diodes 10, 20, 30, 40, 50 and 70, so that the light flux emitted by the LED diode 60 is higher than the light flux emitted by the other LED diodes, thereby providing extra lighting of the marking plate L6 compared with the other marking plates, L1, L2, L3, L4, L5 and L7, which have a faint lighting produced by their respective LED diodes;

when the lever arm 6 is situated in any other position, such as the position indicated as L2 in FIGS. 2 and 4, the moving contact 95 no longer makes connection with the fixed contact 63 by making connection with the fixed contact 23;

in such a situation, the process described above in relation to the LED diode 60 is applicable to the LED diode 20, that is, a current passes through LED diode 20 which is limited only by the resistor 21, while the other LED diodes 10, 30, 40, 50, 60 and 70 have a current passing through them which is limited by the pairs of resistors which make up the voltage dividers to which they are connected, respectively, thereby providing extra lighting of the plate L2 marking the selected position of the lever arm 6.

The marking device of the invention thus provides a solution to the above-described disadvantages presented by the known embodiments of marking devices which base the extra lighting of the marking plates L1 to L7 on the utilization of reflective surfaces, since, firstly, with the embodiment of the marking device of the invention that has been described it is possible to situate the translucent plates L1, L2, L3, L4, L5, L6 and L7 in any suitable position independently of the position occupied by the lever arm 6, since extra lighting of same is achieved by modification of the intensity of current passing through the corresponding LED diodes, and, secondly, the level of faint lighting and extra lighting of the marking plates L1, L2, L3, L4, L5, L6 and L7 is determined precisely by the intensity of current passing through the corresponding LED diodes 10, 20, 30, 40, 50, 60 and 70, which can be set in operation according to the resistance values of the pairs of resistors 11–12, 21–22, 31–32, 41–42, 51–52, 61–62 and 71–72 which make up each voltage divider.

I claim:

1. A device for marking a selected position from among a number of allowed positions of an automatic transmission gearshift lever arm of a vehicle transmission in a vehicle having an electrical network, said lever arm being pivotally mounted on a lever arm support in said vehicle so that said lever arm is movable between said allowed positions, said device comprising:

a support plate (1);

a plurality of LED diodes (10, 20, 30, 40, 50, 60, 70) arranged and supported on the support plate (1), said plurality of LED diodes being equal in number to the number of allowed positions of the automatic transmission gearshift lever arm (6);

a plurality of translucent marking plates (L1,L2,L3,L4, L5,L6,L7), each of said marking plates being provided with a graphic marking indicative of a working speed of the vehicle transmission and each of said LED diodes being located adjacent a respective one of the translucent marking plates so that the graphic marking thereon is illuminated by light from the LED diode adjacent thereto when energized; and a lever switch (2) comprising a switching plate (80) made of insulating material and mounted on the lever arm support (4), a plurality of fixed electrical contacts (13, 23, 33, 43, 53, 63, 73) arranged spaced from each other on the switching plate, a selector arm (81) cooperating with the lever arm (6) so as to move with the lever arm (6) between said allowed positions, a moving electrical contact (82) fixed on the selector arm (81) and an extended electrical contact (83) extending on the switching plate (80) so that a permanent electrical connection is maintained between the moving electrical contact (82) and the extended electrical contact (83) arranged on the switching plate (80) when the lever arm (6) is moved between the allowed positions;

wherein each of said LED diodes (10, 20, 30, 40, 50, 60, 70) is directly connected to the electrical network through a respective pair of resistors (11,12; 21,22; 31,32; 41,42; 51,52; 61,62; 71,72) connected in series, one (12, 22,32,42,52,62,72) of said resistors of each of said pair of said resistors having one end thereof connected to said extended electrical contact (83) and another end thereof opposite from the one end connected to a respective one of said fixed electrical contacts (13, 23, 33, 43, 53, 63, 73) of the lever switch (2) so that for each of the allowed positions of the lever arm (6), the extended electrical contact (83), moving electrical contact (82) and the one of the fixed electrical contacts correspond to the selected position of the lever arm (6) are electrically connected so that all of said LED diodes are energized but the LED diode corresponding to the selected position of the lever arm (6) emits a higher-level light flux than the remaining ones of the LED diodes.

2. The device as defined in claim 1, wherein the support plate (1) and the switching plate (80) are provided with respective means of interconnection.

* * * * *